US012697806B2

(12) United States Patent
Monforton et al.

(10) Patent No.: US 12,697,806 B2
(45) Date of Patent: *Aug. 4, 2026

(54) MOISTURE BARRIER FILMS

(71) Applicant: GENERAL MILLS, INC.,
Minneapolis, MN (US)

(72) Inventors: Randal J. Monforton, Minnetrista, MN
(US); Mychal Barrett Brosch,
Chanhassen, MN (US); **Adam C
Feigum, Andover, MN (US); Ramin
Heydarpour**, Beverly Hills, CA (US);
Kenneth Lin, San Marino, CA (US);
George A Tuszkiewicz, Plymouth, MN
(US); Sriram Venkatasanthanam,
Chino Hills, CA (US)

(73) Assignee: GENERAL MILLS, INC.,
Minneapolis, MN (US)

( * ) Notice: Subject to any disclaimer, the term of this
patent is extended or adjusted under 35
U.S.C. 154(b) by 190 days.

This patent is subject to a terminal dis-
claimer.

(21) Appl. No.: 18/419,649

(22) Filed: Jan. 23, 2024

(65) Prior Publication Data

US 2024/0157690 A1 May 16, 2024

Related U.S. Application Data

(63) Continuation-in-part of application No. 15/765,630,
filed as application No. PCT/US2016/056416 on Oct.
11, 2016, now Pat. No. 11,912,488.
(Continued)

(51) Int. Cl.
B32B 27/18 (2006.01)
B32B 7/02 (2019.01)
(Continued)

(52) U.S. Cl.
CPC ............... B32B 27/18 (2013.01); B32B 7/02
(2013.01); B32B 27/08 (2013.01); B32B 27/32
(2013.01);
(Continued)

(58) Field of Classification Search
None
See application file for complete search history.

(56) References Cited

U.S. PATENT DOCUMENTS 4,814,124 A 3/1989 Aoyama et al.
5,153,038 A 10/1992 Koyama et al.
(Continued)

FOREIGN PATENT DOCUMENTS

EP 1484176 12/2004
EP 1685954 6/2006

OTHER PUBLICATIONS

Gokhale et al., "Recent advances in the fabrication of nanostructured
barrier films," Journal of Nanoscience and Nanotechnology, vol. 14,
No. 3, pp. 2157-1277, 2014.
(Continued)

*Primary Examiner* — Arti Singh-Pandey
(74) *Attorney, Agent, or Firm* — McDonald Hopkins LLC

(57) ABSTRACT

A multilayer moisture barrier film includes at least one
desiccant-containing layer disposed adjacent to at least one
desiccant free layer, where the at least one desiccant-con-
taining layer comprises a polymeric matrix defining a plu-
rality of cavities and desiccant particles, wherein at least one
of the plurality of cavities has at least one desiccant particle
in communication therewith.

26 Claims, 7 Drawing Sheets

Related U.S. Application Data

(60) Provisional application No. 62/239,338, filed on Oct. 9, 2015.

(51) Int. Cl.

| | |
|---|---|
| *B32B 27/08* | (2006.01) |
| *B32B 27/32* | (2006.01) |
| *B65D 65/40* | (2006.01) |
| *B65D 81/26* | (2006.01) |

(52) U.S. Cl.
CPC ........... *B65D 65/40* (2013.01); *B65D 81/266* (2013.01); *B32B 2264/1021* (2020.08); *B32B 2264/301* (2020.08); *B32B 2307/518* (2013.01); *B32B 2307/7246* (2013.01); *B32B 2439/70* (2013.01); *B32B 2553/00* (2013.01)

(56) References Cited

U.S. PATENT DOCUMENTS

| | | | |
|---|---|---|---|
| 6,235,219 | B1 | 5/2001 | Beckenhauer |
| 11,912,488 | B2 * | 2/2024 | Monforton .............. B32B 27/34 |
| 2004/0115458 | A1 | 6/2004 | Kong |
| 2004/0122175 | A1 | 6/2004 | Hekal |
| 2005/0276943 | A1 | 12/2005 | Iwasa et al. |
| 2006/0024520 | A1 | 2/2006 | Kong et al. |
| 2006/0269708 | A1 * | 11/2006 | Merical .................. B32B 27/20 428/35.7 |
| 2007/0160789 | A1 | 7/2007 | Merical et al. |
| 2008/0012172 | A1 | 1/2008 | Merical et al. |
| 2010/0021326 | A1 | 1/2010 | Oguma et al. |
| 2012/0308789 | A1 | 12/2012 | Lockhart et al. |
| 2014/0171571 | A1 | 6/2014 | Kayama et al. |
| 2014/0264167 | A1 | 9/2014 | Solovyov et al. |
| 2016/0030918 | A1 | 2/2016 | Kaimoto et al. |

OTHER PUBLICATIONS

Hernandez, "Food packaging materials, barrier properties, and selection," Handbook of food engineering practice, CRC Press (1997), Ch. 8, pp. 296-365.

Chanda et al., Plastics Technology Handbook, 4th edition, CRC Press, Boca Raton, p. 2-29. 2007.

Breil, "Oriented film technology" Multilayer Flexible Packaging, edited by John Wagner, 2009.

Mount III, "Biaxially stretched films for use in snack packaging," Biaxially Stretching of Film, edited by Mark T. Muese, 2011.

* cited by examiner

100/200

100/200

Desiccant Particle           Cavity

TOTAL WEIGHT GAIN (PRODUCT AND PACKAGE) VS. TIME

MOISTURE BARRIER FILMS

CROSS-REFERENCE TO RELATED APPLICATIONS

This application is a continuation-in-part of and claims priority to and the benefit of U.S. application Ser. No. 15/765,630 filed on Apr. 3, 2018, which claims priority to and the benefit under 35 U.S.C 371(c) of International Application PCT/US2016/056416 filed on Oct. 11, 2016, which claims priority to and the benefit of U.S. Provisional Application No. 62/239,338 filed on Oct. 9, 2015.

FIELD

This disclosure generally relates to, among other things, a multilayer moisture barrier that includes a desiccant; to packaging that includes the multilayer moisture barrier; and to products, such as food stuffs, contained in packaging that includes the multilayer moisture barrier.

BACKGROUND

Some products, such as certain foodstuffs, are preferably maintained in environments having humidity within desirable ranges. For example, some foodstuffs are preferably kept moist, and some foodstuffs are preferably kept dry. Such products can be sealed within packaging films that have moisture barrier properties to maintain humidity in the sealed environment within desired ranges by inhibiting transmission of moisture across the films. Moisture barrier properties can be particularly beneficial when the packaged products are exposed to external environments that have humidity levels that vastly differ from the desirable ranges and temperatures that increase the moisture transfer gradient.

Moisture barrier properties of packaging films can be a function of the materials and structure of the films. One very effective way to reduce Water Vapor Transmission Rates (WVTRs) of films is to coat a layer of the film with a thin layer of metal, such as aluminum; metal oxide, such as aluminum oxide; or polymer. Coating a film or a layer of a film with a thin layer of metal can result in a substantial reduction in WVTR. However, some moisture barrier coatings can be relatively expensive and can reduce or eliminate transparency of the packaging film.

Packaging films having a product-contacting layer that contains a desiccant have been proposed for moisture-sensitive products. The desiccant in the product-contacting layer can adsorb moisture within a product-contacting sealed environment, but is not thought to serve as a moisture barrier. Such packaging films are typically designed to absorb large amounts of moisture from inside or outside or both sides of the package.

SUMMARY

This disclosure describes, among other things, multilayer moisture barriers, packaging films containing the multilayer moisture barriers, and articles including products such as foodstuffs that are contained within packages that include the multilayer moisture barriers. The multilayer moisture barrier includes a first outer layer, a second outer layer and at least one inner layer between the first and second outer layers. The at least one inner layer contains a desiccant. In some embodiments described herein, the multilayer moisture barrier is free of a metal layer yet still serves to maintain a desired range of moisture content within a sealed package that includes the multilayer moisture barrier.

In some embodiments described herein, a multilayer moisture barrier has a first outer layer, a second outer layer, and at least one inner layer between the first and second outer layers. The at least one inner layer has a porous polymeric matrix defining a plurality of cavities and has desiccant particles dispersed in the polymeric matrix. At least some of the some of the cavities have one or more of the desiccant particles in communication therewith. That is, a group of one or more desiccant particles can be in communication with one cavity, and a group of one or more desiccant particles can be in communication with another cavity. Some desiccant particles can be in communication with more than one cavity. The presence of cavities can result in increased moisture barrier properties of the multilayer moisture barrier.

In some embodiments described herein, a multilayer moisture barrier has a first outer layer, a second outer layer, and at least one oriented inner layer between the first and second outer layers. The at least one oriented inner layer has a polymeric matrix and desiccant particles disposed in the polymeric matrix. Orientation of the multilayer moisture barrier can improve the moisture barrier performance of the barrier. Without intending to be bound by theory, it is believed that the improved moisture barrier performance associated with orientation is due to the formation of cavities in communication with the desiccant particles.

In some embodiments, an article includes a foodstuff and a package containing the foodstuff. The package includes a flexible film. The flexible film has a moisture barrier layer and at least one desiccant-free polymer layer disposed between the foodstuff and the moisture barrier layer. The moisture barrier layer has at least one polymer layer that includes desiccant particles dispersed throughout the layer. The desiccant has an average size less than about 100 nanometers and is distributed throughout the polymer layer. At least a portion of the desiccant-free polymer layer is in contact with the foodstuff.

In one aspect, provided is a barrier film comprising at least one desiccant-containing layer disposed adjacent to at least one desiccant free layer: the at least one desiccant-containing layer comprising a polymeric matrix defining a plurality of cavities and comprising desiccant particles, wherein at least one of the plurality of cavities has at least one desiccant particle in communication therewith; and the at least one desiccant free layer a polymer matrix, and the at least one desiccant free layer comprises from about 20% to about 60% of the overall thickness of the packaging film.

In one embodiment, the at least one desiccant free layer comprises from about 30% to about 50% of the overall thickness of the packaging film.

In one embodiment, the at least one desiccant-containing layer comprises from about 0.1 wt. % to about 12 wt. % of the desiccant particles.

In one embodiment, the at least one desiccant-containing layer is biaxially oriented.

In one embodiment, the at least one desiccant-containing layer is oriented 2 to 6 times in the machine direction, and 2 to 6 times in the transverse direction. In one embodiment, the at least one desiccant-containing layer is oriented 4 times in the machine direction and 6 times in the transverse direction. In one embodiment, the at least one desiccant-containing layer is oriented 2 times in the machine direction and from 4 to 6 times in the transverse direction.

In one embodiment, the desiccant particles are selected from fumed silica particles.

In one embodiment, the at least one desiccant free layer comprises a first desiccant free layer and a second desiccant free layer, and one of the at least one desiccant-containing layers is disposed between the first and second desiccant free layers.

In one embodiment, the first and second desiccant free layers comprise from about 30% to about 50% of the overall thickness of the packaging film.

In one embodiment, the at least one desiccant-containing layer comprises from about 0.1 wt. % to about 12 wt. % of the desiccant particles.

In one embodiment, the at least one desiccant-containing layer is biaxially oriented.

In one embodiment, the at least one desiccant-containing layer is oriented 2 to 6 times in the machine direction, and 2 to 6 times in the transverse direction.

In one embodiment, the at least one desiccant-containing layer is oriented 4 times in the machine direction and 6 times in the transverse direction.

In one embodiment, the at least one desiccant-containing layer is oriented 2 times in the machine direction and from 4 to 6 times in the transverse direction.

In one embodiment, the desiccant particles are selected from fumed silica particles.

In one embodiment, the at least one desiccant-containing layer comprises a first desiccant-containing layer and a second desiccant-containing layer, and the at least one-desiccant free layer comprises a first desiccant free layer disposed between the first desiccant-containing layer and the second desiccant-containing layer, a second desiccant free layer disposed adjacent the first desiccant-containing layer and opposite the first desiccant free layer, and a third desiccant free layer disposed adjacent the second desiccant-containing layer and opposite the first desiccant free layer.

In one embodiment, the first, second, and third desiccant free layers comprise from about 30% to about 50% of the overall thickness of the packaging film.

In one embodiment, the at least one desiccant-containing layer comprises from about 0.1 wt. % to about 12 wt. % of the desiccant particles.

In one embodiment, the at least one desiccant-containing layer is biaxially oriented.

In one embodiment, the at least one desiccant-containing layer is oriented 2 to 6 times in the machine direction, and 2 to 6 times in the transverse direction.

In one embodiment, the at least one desiccant-containing layer is oriented 4 times in the machine direction and 6 times in the transverse direction.

In one embodiment, the at least one desiccant-containing layer is oriented 2 times in the machine direction and from 4 to 6 times in the transverse direction.

In one embodiment, the desiccant particles are selected from fumed silica particles.

In one aspect, provided is a package defining an interior space for holding a product, the package comprising the film of any of the previous embodiments.

In one embodiment, the at least one desiccant-containing layer comprises an outer layer of the package.

In one embodiment, the at least one desiccant free layer comprises an outer layer of the package.

In another aspect, provided is an article comprising: a packaging film comprising a multilayer moisture barrier having a first outer layer, a second outer layer, and first, second, and third inner layers disposed between the first and second outer layers, the first inner layer disposed adjacent to the first outer layer, the second inner layer disposed adjacent to the second outer layer, and the third inner layer disposed between the first inner layer and the second inner layer, each of the first outer layer, the second outer layer, the first inner layer, the second inner layer, and the third inner layer independently comprise a polymer matrix; wherein the polymeric matrix of each of the first and second inner layers defines a plurality of cavities, wherein one or more of the plurality of cavities have one or more desiccant particles in communication therewith, and a plurality of the desiccant particles are in communication with multiple cavities of the plurality of cavities, wherein the polymeric matrix of the first and second inner layers are each an oriented layer, and the packaging film is configured to maintain desired range of moisture content within the article.

In one embodiment, the first and second inner layers each independently comprise from 0.1 wt. % to 12 wt. % of the desiccant particles. In one embodiment, the first and second inner layers each independently comprise from 3 wt. % to 12 wt. % of the desiccant particles. In one embodiment, the first and second inner layers each independently comprise from 6 wt. % to 10 wt. % of the desiccant particles.

In one embodiment, the desiccant particles have a size of less than 100 nanometers. In one embodiment, the desiccant particles have a size of less than 50 nanometers.

In one embodiment, the desiccant particles have a specific surface area greater than 100 $m^2$/g. In one embodiment, the desiccant particles have a specific surface area greater than 300 $m^2$/g.

In one embodiment, the first and second outer layers are substantially free of desiccant particles.

In one embodiment, the third inner layer is substantially free of desiccant particles.

In one embodiment, the first outer layer of the multilayer moisture barrier is sealable.

In one embodiment, the multilayer moisture barrier is free of a metal layer.

In one embodiment, the article is free of a metal layer.

In one embodiment, the desiccant comprises silica particles. In one embodiment, the desiccant comprises fumed silica particles.

In one embodiment, the first and second inner layers are biaxially oriented.

In one embodiment, the first and second inner layers are biaxially oriented to at least two times in the machine direction (MD) and at least two times in the transverse direction (TD).

In one embodiment, the first and second inner layers are biaxially oriented to at least four times in the machine direction (MD) and at least four times in the transverse direction (TD).

In one embodiment, the first and second inner layers are biaxially oriented to at least four times in the machine direction (MD) and at least six times in the transverse direction (TD).

In one embodiment, the first and second inner layers are biaxially oriented and comprises a polypropylene or polyethylene terephthalate.

In one embodiment, the first and second inner layers are uniaxially oriented.

In one embodiment, the first and second inner layers are uniaxially oriented to at least two times in the machine direction (MD).

In one embodiment, the first and second inner layers are uniaxially oriented to at least four times in the machine direction (MD).

In one embodiment, the first and second inner layers are uniaxially oriented to at least six times in the machine direction (MD).

In one embodiment, the first and second inner layers are blown to two times and then uniaxially oriented to at least two times in the machine direction (MD).

In one embodiment, the first and second inner layers are blown to two times and then uniaxially oriented to at least four times in the machine direction (MD).

In one embodiment, the first and second inner layers are blown to two times and then uniaxially oriented to at least six times in the machine direction (MD).

In one embodiment, the first and second inner layers are uniaxially oriented and comprises a polyethylene.

In one embodiment, the first and second outer layers are substantially free of cavities.

In one embodiment, the first and second outer layers are each less than 20% of the overall thickness of the multilayer barrier film.

In one embodiment, the third inner layer is substantially free of cavities.

In one embodiment, the third inner layer is more than 20% of the overall thickness of the multilayer barrier film.

In one embodiment, the third inner layer is more than 30% of the overall thickness of the multilayer barrier film.

One or more embodiments of the compositions, moisture barriers, packaging films, articles and methods described herein provide one or more advantages over prior compositions, moisture barriers, packaging films, articles and methods. Such advantages will be readily understood from the following detailed description.

Figure 1:
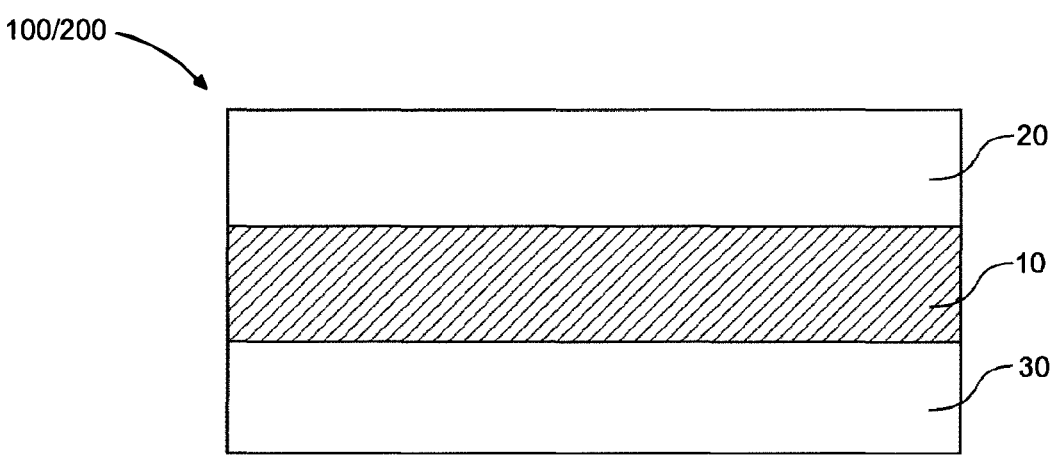
FIG. 1 is a schematic sectional view of an embodiment of a multilayer moisture barrier.

The schematic drawings are not necessarily to scale. Like numbers used in the drawings refer to like components, steps and the like. However, it will be understood that the use of a number to refer to a component in a given drawing is not intended to limit the component in another drawing labeled with the same number. In addition, the use of different numbers to refer to components in different drawings is not intended to indicate that the different numbered components cannot be the same or similar to other numbered components.

Reference will now be made in greater detail to various embodiments of the subject matter of the present disclosure, some embodiments of which are illustrated in the accompanying drawings

DETAILED DESCRIPTION

This disclosure describes, among other things, multilayer moisture barriers for use in packaging films. One use for such packaging films is to keep dry products, such as potato chips, pretzels, cookies, crackers, powders, food bars such as granola bars, and the like, dry and to keep moist products, such as cheese, muffins, chewing gum, and the like, moist. Packaged dry products can readily become moist and packaged moist products can readily become dry depending on relative humidity and temperature of the external environment when the products are packaged in films that do not have adequate moisture barriers.

The multilayer moisture barriers disclosed herein include a first outer layer, a second outer layer and at least one inner layer between the first and second outer layers. The at least one inner layer contains a desiccant. The multilayer barrier films described can, in some embodiments, be free of metal layers, which can result in reduction of production costs relative to films including thin metal layers.

While metallization is often considered to provide very effective moisture barrier protection for flexible packaging, some metal layer-free multilayer moisture barrier embodiments described herein have been shown to have moisture barrier properties that approach those of metal layer containing films.

In many aspects, the multilayer moisture barriers described herein are surprisingly effective moisture barriers because desiccants were previously considered to have a limited capacity to sorb moisture and were not thought to serve as effective moisture barriers once their sorption capacity was reached.

Unexpectedly, some embodiments of desiccant-containing moisture barrier layers described herein exhibit improved moisture barrier properties after being subjected to conditions that may have previously been thought to exceed the sorption capacity of the desiccant.

In some embodiments described herein, multilayer moisture barriers having an inner desiccant-containing layer where the inner layer includes a plurality of cavities. Surprisingly, the porous nature of the inner desiccant-containing layer can result in more effective moisture barrier properties. That a porous film layer would result in a better moisture barrier than a non-porous film layer is counterintuitive.

Desiccant

Any suitable desiccant can be included in an inner layer of a multilayer moisture barrier described herein. For purposes of the present disclosure, a "desiccant" is a molecule that absorbs water, adsorbs water, or reacts with water via chemical reaction (e.g., hydration) to form a new compound. For purposes of the present disclosure, "sorb" means absorb, adsorb, or both absorb and adsorb. In many embodiments, an inner layer of the moisture barrier includes a desiccant that sorbs water via physisorption or a desiccant that, upon reaction with water, sorbs water via physisorption.

Examples of suitable desiccants that sorbs water via physisorption or a desiccant that, upon reaction with water, sorbs water via physisorption, one or more of which can be included in an inner layer of a moisture barrier, include anhydrous salts, molecular sieves, silica gels, clays, starches, ammonium chloride, calcium chloride, calcium carbonate, calcium oxide, potassium chloride, potassium carbonate, sodium chloride, sodium phosphate di-basic, sodium pyrophosphate, and sodium nitrate. Some preferred examples of suitable desiccants include silica such as fumed silica or amorphous silica, silicates, zeolites, clays, activated carbon, calcium chlorite, calcium carbonate, absorbent polymers, and the like.

In some embodiments, one or more desiccants included in an inner layer of a moisture barrier as described herein are present as particles having an average size of about 100 nanometers or less. For example, the particles can have an average size of 50 nanometers or less; of 12 nanometers or less, of 7 nanometers or less, or of 5 nanometers or less. Generally, the particles will have an average size of 1 nanometer or more. Practical limitations to the lower limit of the size of the particles exist, as very small particles can have such little mass that they may not easily be handleable.

In some embodiments, one or more desiccants included in an inner layer of a moisture barrier have an average particle size in one dimension in a range from 1 nanometer to 100 nanometers, such as from 1 nanometer to 50 nanometers, or from 1 nanometer to 10 nanometers. Aggregates comprising two or more particles tend to be formed and, in some embodiments, have a size in one characteristic dimension in a range from 5 nanometers to 10,000 nanometers, such as from 100 nanometers to 7,500 nanometers, or from 500 nanometers to 5,000 nanometers. The characteristic dimension can be a diameter, edge of a face, length of a rod, thickness of a platelet or the like.

In some embodiments, one or more desiccant particles are fumed silica, such as Evonik Aerosil 380, having an average particle size of between 1 and 50 nanometers, such as about 5 nanometers, about 7 nanometers, about 12 nanometers, or about 50 nanometers.

Incorporation of Desiccant in Polymeric Matrix

One or more desiccant can be incorporated into a polymeric matrix and formed as an inner layer of a multilayer moisture barrier in any suitable manner. For example, a desiccant can be mixed, blended, or otherwise incorporated into a polymeric matrix. The polymer matrix can be fed into an extruder. In some embodiments, molten polymer and desiccant are blended or mixed. In some embodiments, desiccant is sprayed or deposited on a molten polymer. In some embodiments, desiccant is introduced into a solvent for the polymer to generate a desiccant-solvent composition, which is contacted with the polymer to introduce the desiccant to the polymer.

It is believed that the more homogenously the desiccant is distributed in the polymeric matrix, the better the resulting moisture barrier properties will be because the probability that a water molecule traversing a desiccant-containing layer will interact with a desiccant particle will be increased. To increase the homogenous distribution of desiccant particles, the desiccant particles can be exfoliated prior to mixing with the polymer. Exfoliation can be particularly advantageous with small desiccant particles, such as particles less than 100 nanometers.

In some embodiments, the desiccant is exfoliated in a low molecular weight medium to form a master batch. In some embodiments, the desiccant is exfoliated in a low molecular weight wax. The master batch is then dispersed in a polymer. The polymer containing the exfoliated and dispersed desiccant can then be formed into a film.

An inner layer of a moisture barrier described herein can include any suitable amount of desiccant. Preferably, the inner layer, alone or in combination with other desiccant-containing inner layers, includes an amount of desiccant effective to provide moisture barrier properties to the multilayer moisture barrier film. Practical upper limits may exist regarding the amount of desiccant material that can be incorporated into a polymer layer. However, it is believed that a layer of a multilayer moisture barrier described herein can include up to about 50% or more by weight desiccant. In many embodiments, a layer of a multilayer moisture barrier described herein includes about 0.1% by weight or more desiccant, such as 1% by weight or more desiccant. By way of example, a layer of a multilayer moisture barrier described herein can include from about 1% to about 50% by weight desiccant, such as from about 1% to about 25% by weight desiccant, from about 6% to about 12% by weight desiccant, or about 10% by weight desiccant. In embodiments, a layer of a multilayer moisture barrier may include from about 0.1 wt. % to about 12 wt %, from about 0.5 wt. % to about 10 wt. %, from about 1 wt. % to about 8 wt. %, or from about 3 wt. % to about 6 wt. % of desiccant. In embodiments, a layer of a multilayer moisture barrier may include from about 3 wt. % to about 12 wt. %. In still other embodiments, a layer of a multilayer moisture barrier may include from about 6 wt. % to about 10 wt. % of desiccant.

The desiccant can be incorporated into any suitable polymeric composition. The polymeric composition can be selected from a wide variety of thermoplastic polymers, blends of thermoplastic polymers, or blends of thermoplastic polymers with thermosetting polymers. The polymeric composition can comprise a homopolymer, a copolymer such as a star block copolymer, a graft copolymer, an alternating block copolymer or a random copolymer, ionomer, dendrimer, or a combination comprising at least one of the foregoing. The polymeric composition can also be a blend of polymers, copolymers, terpolymers, or the like, or a combination comprising at least one of the foregoing. In some embodiments, the thermoplastic polymer comprises a polyolefin. In some embodiments, the polymeric composition comprises a polypropylene.

Examples of thermoplastic polymers that can be used in the polymeric composition include polyacetals, polyacrylics, polycarbonates, polyalkyds, polystyrenes, polyolefins, polyesters, polyamides, polyaramides, polylactic acids, polyamideimides, polyarylates, polyurethanes, silicones, polyarylsulfones, polyethersulfones, polyphenylsulfones, polycarbonates, silicones, polycarbonate-polyorganosiloxanes, polyphenylene sulfides, polyhydroxyalkanoates, polyhydroxybutyrate, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitim ides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polyvinylidene chlorides, polysiloxanes, or the like, or a combination comprising at least one of the foregoing thermoplastic polymers.

In some embodiments the polymeric composition of an inner layer of a multilayer moisture barrier includes one or more of a polyamide, polyvinyl alcohol, polyethylene vinyl alcohol, cyclic olefin copolymer, polyolefin, a polylactic acid, a polyethylene terephthalate, and a polyvinylidene dichloride. In some embodiments, the polymeric composition of an inner layer comprises a polyolefin, such as one or more of polyethylene, polypropylene, polymethylpentene, and polybutene. In some embodiments, the polymeric composition of the inner layer comprises polypropylene, polyethylene or polyethylene terephthalate.

One or more polymers can account for any suitable weight percent of a desiccant-containing inner layer of a multilayer moisture barrier as described herein. For example, a desiccant-containing inner layer can include from about 5 to about 99.9% by weight of the polymer. By way of further example, a desiccant-containing inner layer can include from about 30 to about 99% by weight of the polymer, such as from about 50 to about 90% by weight of the polymer.

A desiccant-containing inner layer of a moisture barrier film described herein can include one or more optional additives. Examples of optional additives that can be included antioxidants, antilock, slip additives, color concentrates, colorants, fillers, plasticizers, processing aids, ultraviolet (UV) inhibitors, surfactants, and the like. Such optional additives, if present, will typically account for 20% of the weight or less of the inner layer.

A desiccant-containing inner layer of a moisture barrier can be formed as a film in any suitable manner, such as via flat or annular extrusion, casting, thermal forming, or the like.

A desiccant-containing inner layer can be formed as a film having any suitable thickness. In some embodiments, a desiccant-containing inner layer can have a thickness of from about 0.00015" to about 0.02", depending in part on the process by which the film is formed.

Microcavitation of Desiccant

In some embodiments, a desiccant-containing inner layer of a multilayer moisture barrier has a plurality of cavities formed in the polymeric matrix forming the layer. The inventors have discovered that forming cavities in a desiccant-containing inner layer can result in improved moisture barrier properties of the multilayer moisture barrier film when the cavities have associated desiccant particles in communication therewith. Accordingly, less desiccant can be used to form effective multilayer moisture barriers if the desiccant-containing film layer has cavities (relative to substantially similar desiccant-containing films that lack cavities). Without wishing to be bound by theory, it is believed that the presence of desiccant particles in communication with the cavities increases the amount of water that can sorb to a desiccant particle through the bulk phase or increases the probability that a given water molecule will interact, at least indirectly through the bulk phase, with a desiccant particle.

Cavities in communication with desiccant particles can be formed in any suitable manner. In some embodiments, natural cavitation can occur during formation of the inner film layer in areas of aggregated desiccant particles. In some embodiments, the formulation of the composition used to form a desiccant-containing inner layer can result in cavities surrounding a desiccant particle. For example, blending desiccant particles with a polymeric composition in the presence of a surfactant may result in encapsulation desiccant particles and formation of cavities upon formation of the film layer due to resultant low adhesion between particles and polymer. The inventors have found that the formation of surfactant particles that do not include associated desiccant can result in cavities in the resulting film for which no desiccant is in communication. Cavities for which a desiccant particle is not in communication can be counterproductive to the moisture barrier properties a moisture barrier containing the resulting film. Accordingly, care is preferably taken to maximize the number of surfactant particles that include at least one associated desiccant particle.

Further, the inventors have found that the amount of desiccant in communication with the cavities can be varied or selected to provide a desired level of barrier performance. Higher loadings of desiccant will result in more cavities, but the loading should be controlled to prevent the film from becoming too porous such that it does not effectively function as a barrier film. If the desiccant level is too low, then too few cavities may be created and the film behaves similar in barrier performance to a film without the inventive feature. As described herein, barrier properties can be obtained at relatively low levels of desiccant to provide a sufficient level of cavities and particles in communication with those cavities. This observation is counter intuitive to the conventional understanding of desiccant films where maximizing the desiccant volume is desirable, or even necessary, for the desiccant to function as a desiccant to absorb as much moisture as possible. In this regard, the barrier films of this invention are unlike the desiccant films described in prior art in that, as described herein, by providing films with cavities with desiccant in communication with the cavities, vapor pressure builds within the cavity to provide a moisture barrier.

In addition, it is believed that more cavities that have at least one desiccant particle in communication within, the better the barrier performance of the cavitated layer. Without wishing to be bound by theory, the moisture in contact with or bonded to the desiccant particle in communication with a cavity then increases the vapor pressure inside the cavity and stops additional moisture in vapor form from passing through the cavity. In other words, a cavity that is in communication with a desiccant particle that is saturated with moisture becomes a barrier to moisture transmission through the cavity. On the other hand, a cavity that is not in communication with a desiccant particle continues to transmit moisture vapor through the cavity without any resistance to the transmission. As a consequence, it is desirable to have more cavities having one or more particles in communication therewith so that such cavities can function as a barrier to moisture vapor transmission and minimize the cavities without particles that let through moisture without any resistance.

In some embodiments, the desiccant particles are selected based on their specific surface area. Without wishing to be bound by any particular theory, desiccant particles with higher specific surface area are more effective in providing barrier performance. The higher surface area increases the water absorption capacity and is expected to result in a higher vapor pressure inside the cavity that is in communication with the desiccant particle. The higher vapor pressure results in higher barrier to moisture transmission through the cavity. In one embodiment, the desiccant particle has a specific surface area between 100 $m^2/g$ to 500 $m^2/g$, from 150 $m^2/g$ to 450 $m^2/g$, or from 200 $m^2/g$ to 400 $m^2/g$.

Further, the level of desiccant and effective mixing to disperse the desiccant particles will increase the chances of cavities being in communication with at least one desiccant particle.

In some embodiments, the inner layers are oriented to create cavities in communication with desiccant particles. The inner layers can be either monoaxially or biaxially oriented. Orientation of the film layer in which desiccant particles are present in the polymeric matrix can cause cavities to preferentially form in the region of the desiccant particles. The size of the cavities can be controlled by variables including but not limited to the degree of orientation (e.g., stretching), particle size, particle orientation in the melt stream, adhesion strength between polymer and particle, temperature during orientation, and inner layer thickness. The inventors have found that orienting a desiccant-containing film in the melt state may not effectively produce cavities, particularly when the desiccant particles or aggregates are small; e.g., 1000 nanometers of less. Accordingly, in some embodiments it is preferable to orient the film in the solid state. Under appropriate conditions, a high percentage of cavities having a desiccant particle in communication therewith can be formed by orientation.

In some embodiments, the desiccant containing film layers are oriented subsequent to film production in a post processing orientation step. This process involves reheating the desiccant containing film to its softening point and subsequently stretching the film to at least two-fold in one or both directions. Inventors believe that typical processes for producing films such as extrusion casting or extrusion blown film provide very low level of orientation to the polymer layers and is insufficient to create cavities that are desirable for the present invention. It is believed that orientating the film in a post process step is more effective in creating cavities that are in communication with at least one desiccant particle. Without wishing to be bound by theory, stretching the layers containing a desiccant in a post process step involves reheating the film to soften the layers, however, the polymer in proximity to desiccant particles tend to be relatively harder, and subsequent stretching results in softer sections stretching to a greater extent than the harder sections. This difference in stretching behavior results in cavities being formed in proximity of the harder sections and such cavities include one or more desiccant particles that are in communication with the cavity.

It is believed that a biaxial orientation method that is an effective in providing a uniform coverage of cavities across the desiccant containing layers. The biaxial stretching process is performed in two directions within the film. The machine direction (MD) is the direction that the film moves through the machine from start to finish. The transverse direction (TD) is the direction perpendicular to the machine direction. Film can be biaxially oriented in two different ways, sequentially and simultaneously. In the sequential orientation process, the film is first oriented in the machine direction. After the machine direction orientation, the film is stretched independently in the transverse direction. In the simultaneous orientation process, on the other hand, the film is stretched at the same time in both directions in a single step. Typically, the stretch ratios in both the machine and transverse directions are equivalent. There are two primary industrial processes for biaxial stretching of film, the double-bubble method and the tenter method. In the double bubble method, a circular die is used from the extruder to form a thick walled tube of polymer that is blown under air pressure, orienting the film in the transverse direction. At the same time, an equal orientation in the machine direction is achieved by adjusting the speed at which the tube is pulled downwards and collapsed. The double-bubble method is an example of simultaneous orientation. In the tenter production method, polymer is extruded as a sheet and then passed through a stretching unit by rollers moving faster than the rate at which the material is extruded. This orients the film in the machine direction. Film can typically be oriented up to 10 times in the machine direction. The film is then fed into a tenter frame for transverse direction orientation. In the tenter, the film is gripped along each edge by clamps that are attached to moving chains. These move outwards to stretch the film in the transverse direction. Typical stretch ratios depend on the polymer being used, but ratios as high as 10-12 times are possible with some polymers. The tenter method is an example of sequential orientation.

In embodiments, desiccant containing layer is stretched at least 2 times in MD and at least 2 times in TD. In one embodiment, the desiccant containing layer is stretched at least 4 times in MD and at least 4 times in TD. In one embodiment, the desiccant containing layer is stretched at least 4 times in MD and at least 6 times in TD. It is expected that to achieve the target orientation levels the choice of simultaneous or sequential orientation methods will be selected based on the polymer type and desired physical properties of the film. In one embodiment, the desiccant containing layer is stretched from 2 to 6 times in the MD and from 2 to 6 times in the TD, from 3 to 5 times in the MD and from 3 to 5 times in the TD, or 4 times in the MD and 4 times in the TD. In one embodiment, the desiccant containing layer is stretched 2 times in the MD and 2 to 6 times in the TD, 3 to 5 times in the TD, or 4 times in the TD. In one embodiment, the desiccant containing layer is stretched 3 times in the MD and 2 to 6 times in the TD, 3 to 5 times in the TD, or 4 times in the TD. In one embodiment, the desiccant containing layer is stretched 4 times in the MD and 2 to 6 times in the TD, 3 to 5 times in the TD, or 4 times in the TD. Another method of providing cavities within the desiccant containing layer is a blown film process followed by MD orientation. The blown film method is a processing technique that uses air pressure to create TD orientation and a higher speed haul-off roll speed to create MD orientation. If required, additional MD orientation can be achieved by drawing the film between rolls rotating at different speeds, with the second set of rolls running faster than the first set.

In some embodiments, desiccant containing layer is blown to least 2 times prior to stretching it at least 2 times in the MD. In one embodiment, the desiccant containing layer is blown to least 2 times prior to stretching it at least 4 times in the MD. In one embodiment, the desiccant containing layer is blown to least 2 times prior to stretching it at least 6 times in the MD. In embodiments, the desiccant containing layer is blown 2 to 4 times in the MD prior to stretching 2 to 6 times in the MD.

It will be appreciated that the non-desiccant containing layer can also be oriented. The non-desiccant containing layer can be uniaxially oriented or biaxially oriented. If the non-desiccant containing layers are oriented, they can have the same or different orientation as the desiccant containing layers. Additionally, where the film contains two or more non-desiccant containing layers, the non-desiccant containing layers can have the same or different orientations from one another. In embodiments, the non-desiccant containing layer can be stretched from 2 to 6 times in the MD and from 2 to 6 times in the TD, from 3 to 5 times in the MD and from 3 to 5 times in the TD, or 4 times in the MD and 4 times in the TD. In one embodiment, the non-desiccant containing layer is stretched 2 times in the MD and 2 to 6 times in the TD, 3 to 5 times in the TD, or 4 times in the TD. In one embodiment, the non-desiccant containing layer is stretched 3 times in the MD and 2 to 6 times in the TD, 3 to 5 times in the TD, or 4 times in the TD. In one embodiment, the non-desiccant containing layer is stretched 4 times in the MD and 2 to 6 times in the TD, 3 to 5 times in the TD, or 4 times in the TD.

The respective layers, when provided as oriented layers, can be provided by forming the film layers individually and separately stretching/orienting the film layers prior to assembly. In other embodiments, two or more layers can be assembled and then stretched/oriented as desired. In some embodiments the desiccant containing layer is combined with at least one non-desiccant containing layer prior to orientation. Inventors believe that the presence of a non-desiccant containing layer stabilizes the desiccant containing layer and enables orientation of the combined layers to a greater degree than possible with the desiccant containing layer by itself. More specifically, the desiccant containing layer when stretched by itself can lead to stability issues such as visible fissures in the film or web breaks. This may limit the extent to which the desiccant containing films can be stretched while maintaining a stable process. When combined with a non desiccant layer the stability is significantly improved when stretching and prevents issues such as fissures or web breaks.

In some embodiments, pores or cavities can be formed by foaming or other known techniques. However, such techniques may result in a large percentage of cavities or pores that are not in communication with a desiccant particle. This can be counterproductive because it is believed that increasing the percentage of cavities in communication with at least one desiccant particle results in increased moisture barrier properties.

Multilayer Moisture Barrier

In accordance with the teachings presented herein, desiccant-containing layers, by themselves, may not form effective moisture barriers. However, if a desiccant-containing layer is positioned alongside at least one second layer, an effective moisture barrier film can be formed.

In some embodiments, a desiccant containing outer layer is positioned alongside an inner layer that is free or substantially free of desiccant. The inner desiccant-free layer is more effective in improving the barrier performance of the combined layers when it constitutes a major portion of the multilayer film, preferably in the range of about 20% to about 60% of the overall thickness of the two-layer film, from about 25% to about 55% of the two-layer film, or from about 30% to about 50% of the overall thickness of the two-layer film.

In some embodiments, a desiccant containing inner layer is positioned alongside an outer layer that is free or substantially free of desiccant. The outer desiccant-free layer is more effective in improving the barrier performance of the combined layers when it constitutes a major portion of the multilayer film, preferably in the range of about 20% to about 60% of the overall thickness of the two-layer film, from about 25% to about 55% of the two-layer film, or from about 30% to about 50% of the overall thickness of the two-layer film.

In some embodiments, a desiccant containing inner layer is positioned between a first outer film and a second outer layer film that are free or substantially free of desiccant. The outer desiccant-free layers are more effective in improving the barrier performance of the combined layers when they constitute a major portion of the multilayer film, preferably in the range of about 20% to about 60% of the overall thickness of the multilayer film, from about 25% to about 55% of the overall thickness of the multilayer film, or from about 30% to about 50% of the overall thickness of the multilayer film.

In some embodiments, desiccant containing layers are positioned in between a first outer layer and a second outer layer with a desiccant free layer interposed between the desiccant containing layers. The outer layers are also free or substantially free of desiccant. Without wishing to be bound by theory, it is believed that the inner desiccant layer that is closest to the foodstuff absorbs moisture from inside the package and upon reaching saturation provides a barrier to moisture transmission from inside the package. While the outer desiccant layer that is closest to package exterior absorbs moisture from the outside environment and upon saturation provides a barrier to moisture transmission from outside environment into the package. The inner desiccant-free layer that separates the two desiccant layers serves to isolate the two desiccant layers from each other and enhances the barrier performance. This inner desiccant-free layer is more effective in isolating the desiccant layers when it constitutes a major portion of the multilayer film, preferably in the range of from about 20% to about 60% of the overall thickness of the multilayer film, from about 25% to about 55% of the overall thickness of the multilayer film, or from about 30% to about 50% of the overall thickness of the multilayer film.

Because the outer layers can be free of desiccant or may include less desiccant than one or more inner layers, the weight percentage of desiccant in the multi-layer moisture barrier may be lower than the weight percent of desiccant in a desiccant-containing inner layer. In some embodiments, the weight percent of desiccant particles in a multilayer moisture barrier is 0.01% by weight or more.

Any suitable polymer can be used to form the first and second outer layer. For example, the first and second outer layers can be independently formed from a polymer as discussed above with regard to the inner layer. In some embodiments, the polymeric composition of one or both of the first and second outer layers include one or more of a polyolefin, a polyimide, polyvinyl alcohol, polyethylene vinyl alcohol, cyclic olefin copolymer, polylactic acid, a polyethylene terephthalate, and a polyvinylidene dichloride. In some embodiments, the polymeric composition of one or both of the first and second outer layers include comprises a polyolefin, such as one or more of polyethylene, polypropylene, polymethylpentene, and polybutene. In some embodiments, the polymeric composition of one or both of the first and second outer layers comprises polypropylene, polyethylene, or polyethylene terephthalate.

Polyolefins, such as polypropylenes, are known to have inherent moisture barrier properties. In some embodiments, a polyolefin having WVTR of 0.14 grams/1 mil/100 in²/day or less is used as a first outer layer, as second outer layer, or both a first outer layer and a second outer layer.

A multilayer moisture barrier as described herein can include more than one, such as two, three, four or more, desiccant-containing inner layers. Desiccant-containing layers can be adjacent layers in a multilayer moisture barrier or can be separated by one or more desiccant-free layers. Increasing the number of desiccant-containing layers in a multilayer moisture barrier should increase the probability that a water molecule traversing a multilayer moisture barrier will interact with a desiccant particle, which should thus improve the effectiveness of the moisture barrier.

In some embodiments, two or more (or all) of the layers of a multilayer moisture barrier are formed by co-extrusion through, for example, a co-extrusion die. Desiccant can be mixed with a polymer stream feeding an inner desiccant-containing layer. In some embodiments, two or more (or all) of the layers or groups of layers of the multilayer moisture barrier are laminated with heat or adhesive. Any suitable primer layers or coatings may be applied as appropriate to achieve proper lamination. In some preferred embodiments where all of the layers of the multilayer moisture barrier film include compatible polymers, all of the layers of the multilayer moisture barrier film are coextruded.

The first and second outer layers, desiccant-containing layers and any desiccant-free intermediate layers can each have any suitable thickness. In some embodiments, the first and second outer layers, desiccant-containing layers and any desiccant-free intermediate layers can each independently have a thickness of from about 0.00003" to about 0.0008", such as from about 0.00004" to about 0.0008" or from about 0.0001" to about 0.001".

In some embodiments, a desiccant-containing inner layer is oriented by orienting the multilayer barrier layer or a packaging film containing the multilayer moisture barrier.

In some embodiments, the multilayer moisture barrier is free of a metal layer yet still serves to maintain a desired range of moisture content within a sealed package that includes the multilayer moisture barrier.

Packaging

A multilayer moisture barrier may itself be used as a packaging film or may be incorporated into or be treated to form a packaging film. Preferably, the packaging film is flexible and capable of sealing to itself or another film around a product. The packaging film can heat sealable, cold sealable, sealed with an adhesive such as a pressure sensitive adhesive, sealed via an ultrasonic weld, or the like.

One or both of the first and second outer layers of the multilayer moisture barrier can serve as one or both of the outer layers of the packaging film.

If desired one or more layers can be added to the multilayer moisture barrier film by lamination to produce the packaging film. For example, if the first or second outer layers of the moisture barrier do not have suitable protective properties or sealing properties for the packing needs, layers having appropriate properties can be laminated to the moisture barrier.

In some embodiments, the inner polymeric layer of a packaging is coated to facilitate sealing. Any suitable seal-facilitating coating can be applied to the inner polymeric layer. Examples of suitable seal-facilitating coatings include cohesive cold seal coatings, such as acrylic emulsions, natural and synthetic latex materials, and the like, and combinations thereof. Such materials are commercially available from a number of manufacturers such as HB Fuller Co.; Bostik, Inc.; Ashland, Inc.; The Dow Chemical Company; and Henkel AG & Co.

In some cases, for example if the multilayer moisture barrier includes a polyolefin, such as polypropylene, as the first and second outer layer, the moisture barrier will have suitable sealing and protective properties to be used as a packaging film.

Packaged Product

Any suitable product can be contained or sealed within a package containing a multilayer moisture barrier as described herein. Products for which moisture barrier protection is desirable may be advantageously contained or sealed within packages having a multilayer moisture barrier.

In some embodiments, a foodstuff is contained or sealed within a package containing a multilayer moisture barrier as described herein. Any suitable foodstuff can be contained or sealed within a package as described herein. The foodstuffs can be raw or natural foodstuffs or processed foodstuffs. Food processing includes the transformation of raw ingredients into food or transforming forms of food into other forms of food. Food processing often includes using harvested crops or animal products to produce marketable and often long shelf-life products. Processed foodstuffs include products for which additional processing by a consumer may be desired prior to consumption. For example, a foodstuff for which heating, cooking, baking, or the like, may be desired by a consumer prior to consumption may be a processed foodstuff despite not being in its final form (e.g., being unheated, uncooked, unbaked, etc.) prior to delivery to a consumer.

Examples of processed foodstuffs that may be contained or sealed within a package as described herein include a confectionary, a gum, a bakery product, an ice cream, a dairy product, a fruit snack, a chip or crisp, an extruded snack, a tortilla chip or corn chip, a popcorn, a pretzel, a nut, a snack bar, a meal replacement, a ready meal, a soup, a pasta, a canned food, a frozen processed food, a dried processed food, an instant noodle, a chilled processed food, an oil or fat, a sauce dressing or condiment, a dip, a pickled product, a seasoning, a baby food, a spread, a chip or a crisp such as chips or crisps comprising potato, corn, rice, vegetable (including raw, pickled, cooked and dried vegetables), a fruit, a grain, a soup, a seasoning, a baked product such as a ready-to-eat breakfast cereal, hot cereal or dough, an ice cream such as a frozen yogurt, a dairy products such as a yogurt or cheese, ready meal, a soup, a pasta, a canned food, a frozen processed food, a dried processed food, an instant noodle, or a chilled processed food, a beverage including beverages that include fiber or protein a meat or a meat substitute, a pet food, an animal product, and a medical food.

In some embodiments, a foodstuff that may be contained or sealed within a package as described herein includes a vitamin supplement, an infant formula product, a medicinal or pharmaceutical product, or the like.

DRAWINGS

Reference is now made to FIGS. 1-5, which illustrate some embodiments of multilayer moisture barriers 100, packages 200, and articles 400 described herein.

FIG. 1 illustrates a trilayer moisture barrier 100, which can serve as a package 200 or packaging film in some embodiments. The depicted moisture barrier 100 includes a first outer layer 20, a second outer layer 30, and an inner layer 10 between the first and second outer layers. The inner layer contains desiccant. The first 20 and second 30 outer layers and desiccant-containing inner layer 10 can be as described above.

Figure 2:
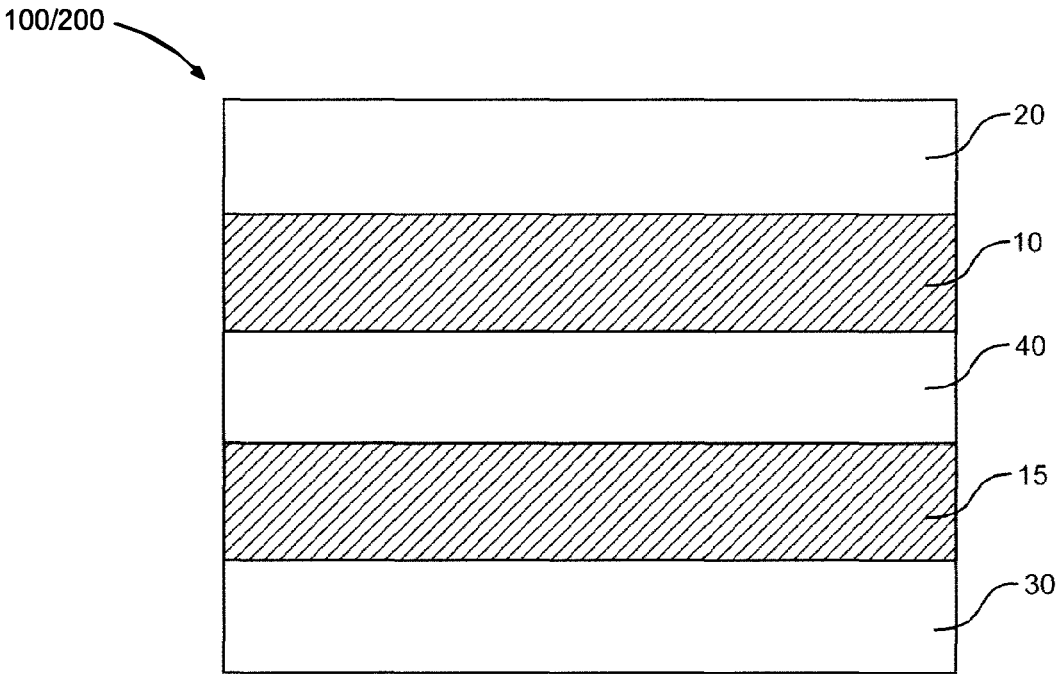
FIG. 2 is a schematic sectional view of an embodiment of a multilayer moisture barrier.

FIG. 2 illustrates a five-layered moisture barrier 100, which can serve as a package 200 or packaging film in some embodiments. The depicted moisture barrier 100 includes a first outer layer 20, a second outer layer 30, and three inner layers (10, 40, 15) between the outer layers. In the depicted embodiment, inner layers 10 and 15 include desiccant. The desiccant-containing layers (10, 15) are separated by desiccant-free layer 40 in the depicted embodiment. The first 20 and second 30 outer layers and inner layers (10, 40, 15) can be as described above.

Figure 3:
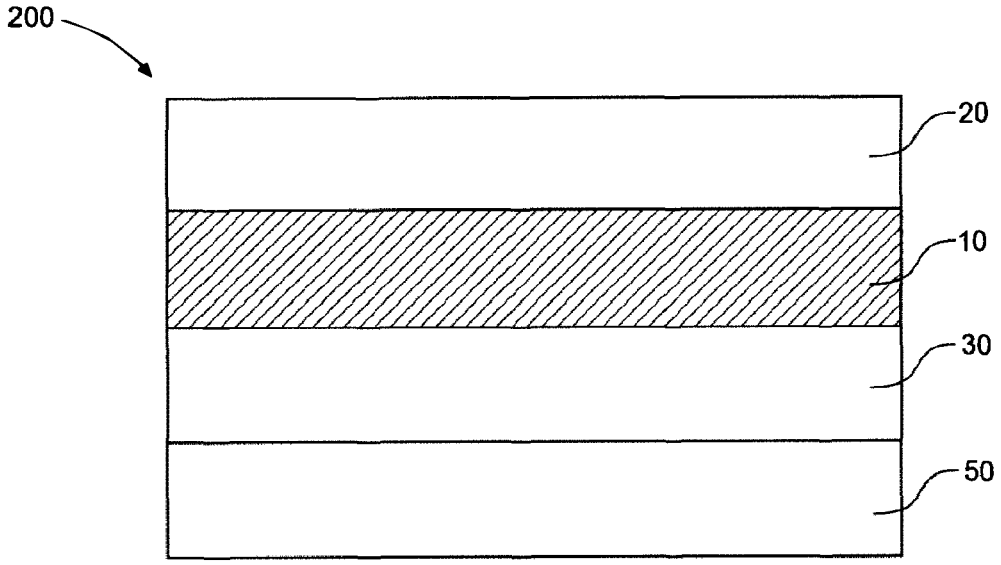
FIG. 3 is a schematic sectional view of an embodiment of a packaging film that includes an embodiment of a multilayer moisture barrier as depicted in FIG. 1.

FIG. 3 illustrates a package 200 or packaging film that includes a moisture barrier as depicted in FIG. 1. In the depicted embodiment, the package 200 includes an outer layer 50 adjacent to the second outer layer 30 of the moisture barrier, which collectively includes layers 20, 10, and 30. While only additional layer 50 is shown, it will be understood that more additional layers beyond the moisture barrier layers may be included to form a package 200 as described herein.

Figure 4:
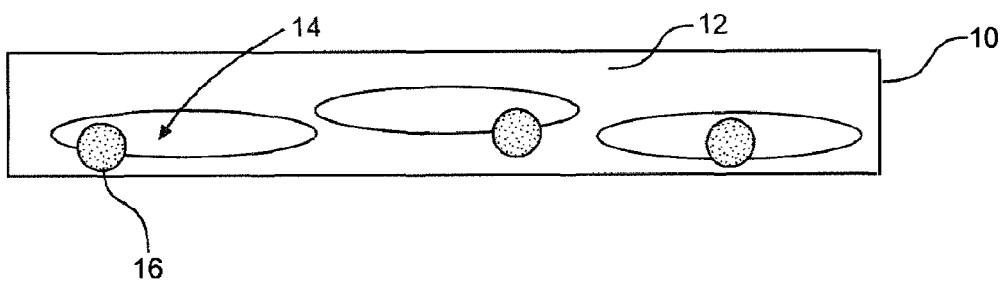
FIG. 4 is a schematic sectional view of an embodiment of a desiccant-containing inner layer of a multilayer moisture barrier.

FIG. 4 illustrates a desiccant-containing inner layer 10. The depicted layer 10 is formed from a polymeric matrix 12 that defines a plurality of cavities 14. Desiccant particles 16 are dispersed throughout the matrix 12 and are in communication with cavities 14. As discussed above, it is preferably, in some embodiments, for the desiccant particles 16 to be homogenously distributed in the polymer matrix 12 and for each cavity 14 formed in the matrix 12 to have a desiccant particle 16 in communication therewith. For purposes of the present disclosure, a desiccant particle is "in communication with" a cavity if a liquid or gas within the cavity can interact with the desiccant particle.

Without intending to be bound by theory, it is believed that interaction of water molecules with a desiccant particle in a cavity in the bulk phase is believed to cause polar orientation of the water molecules within the cavity, which can further increase moisture barrier properties. This theory is consistent with results presented in the Examples below which indicate that multilayer moisture barriers having microcavitated desiccant containing inner layers exhibit improved moisture barrier properties over time in conditions that favor a high degree of moisture driving force. While not intending to be bound by theory, it is believed that the degree of moisture driving force on a microscale (such as between layers of a film) may be decreased by the presence of a desiccant-containing inner layer as described herein.

Figure 5:
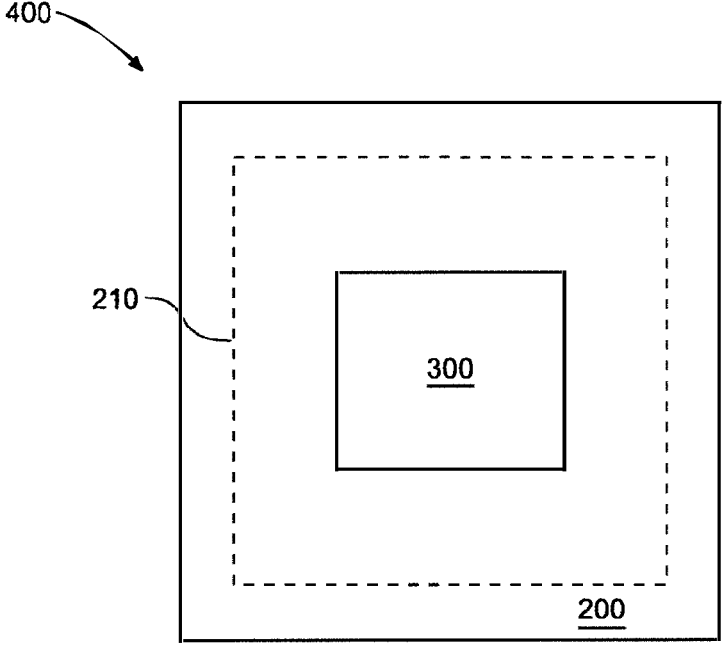
FIG. 5 is a schematic drawing of a product sealed within a package that includes a multilayer moisture barrier.

FIG. 5 illustrates an article 400 that includes a product 300 sealed within a package 200. The package 200 includes a moisture barrier layer (e.g., can be a package as depicted in, for example, FIGS. 1-3). The dashed lines indicate a seal 210 forming a sealed interior of the package 200. The product 300 is sealed within the sealed interior of the package 200. The product 300 can be a foodstuff or any other suitable product.

Definitions

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. As used herein, "consisting essentially of," as it relates to an composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

As used herein, the term "about" encompasses the range of experimental error that occurs in any measurement.

EXAMPLES

In the detailed description above several specific embodiments of moisture barriers, packages, articles and methods are disclosed. It is to be understood that other embodiments are contemplated and may be made without departing from the scope or spirit of the present disclosure. The detailed description, therefore, is not to be taken in a limiting sense.

In the following non-limiting examples that provide illustrative embodiments of the compositions, food products, methods and sweetness enhancers described above. These examples are not intended to provide ay limitation on the scope of the disclosure presented herein.

Example 1—Formation of Desiccant-Containing Films

Desiccant containing layers including 3%, 5%, 8% and 10% by weight Evonik Aerosil 380 silica having an average particle size of 7 nanometers, 12 nanometers, or 50 nanometers were prepared. Briefly, the nanosilica was exfoliated in a low molecular weight medium in a blade blender to generate a master batch. The master batch was dispersed in polypropylene. The desiccant containing polypropylene was coextruded with desiccant free polypropylene to produce a five layer film with two layers of desiccant containing polypropylene and three layers of desiccant free polypropylene. The two desiccant containing layers were separated by a desiccant free layer. The other two desiccant free layers were outer layers. Each layer had a nominal thickness of 0.0003". The film had a nominal thickness of 0.0015". The five-layer film was biaxally oriented (4.5× in the machine direction and 8× in the transverse direction). Three layer control films that did not contain desiccant were made in a similar manner. In some cases, control and desiccant-containing films were not oriented to determine the effect of orientation.

Example 2—Microscopic Examination of Desiccant-Containing Films

Some of the films prepared as described in EXAMPLE 1 were observed via light microscopy of environmental scanning electron microscopy (ESEM). For light microscopy, the films were imaged with a polarized light microscope equipped with a first order red plate. The samples were also imaged by transmitted light. Cross-sections were prepared in a metal holder an imaged by transmitted light.

For ESEM, films were cross-sectioned with a razor blade. Initial images were imaged at 0.45 Torr Later images were imaged at 0.9 Torr to reduce charging. A backscattered electron detector was used to show elemental contrast and the presence of mineral inclusions. Higher elements appear brighter.

Figure 6:
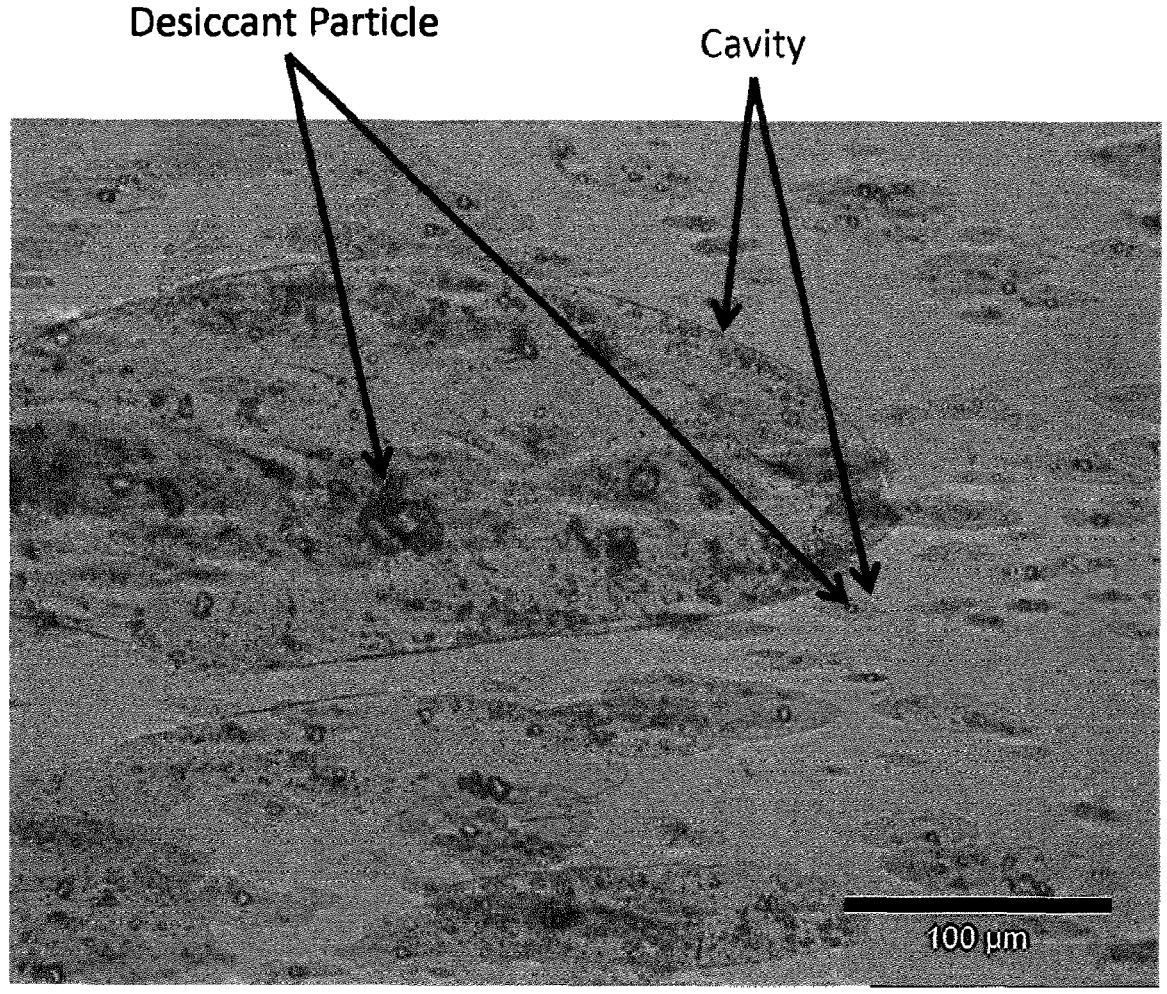
FIG. 6 is a transmitted light microscopy image of an oriented desiccant-containing film surface showing cavities and desiccant particles in communication with the cavities. A representative desiccant particle and cavity are indicated by arrows.

FIG. 6 is a transmitted light microscopy image of an oriented desiccant-containing film showing cavities and desiccant particles in communication with the cavities. A representative desiccant particle and cavity are indicated by arrows.

Figure 7:
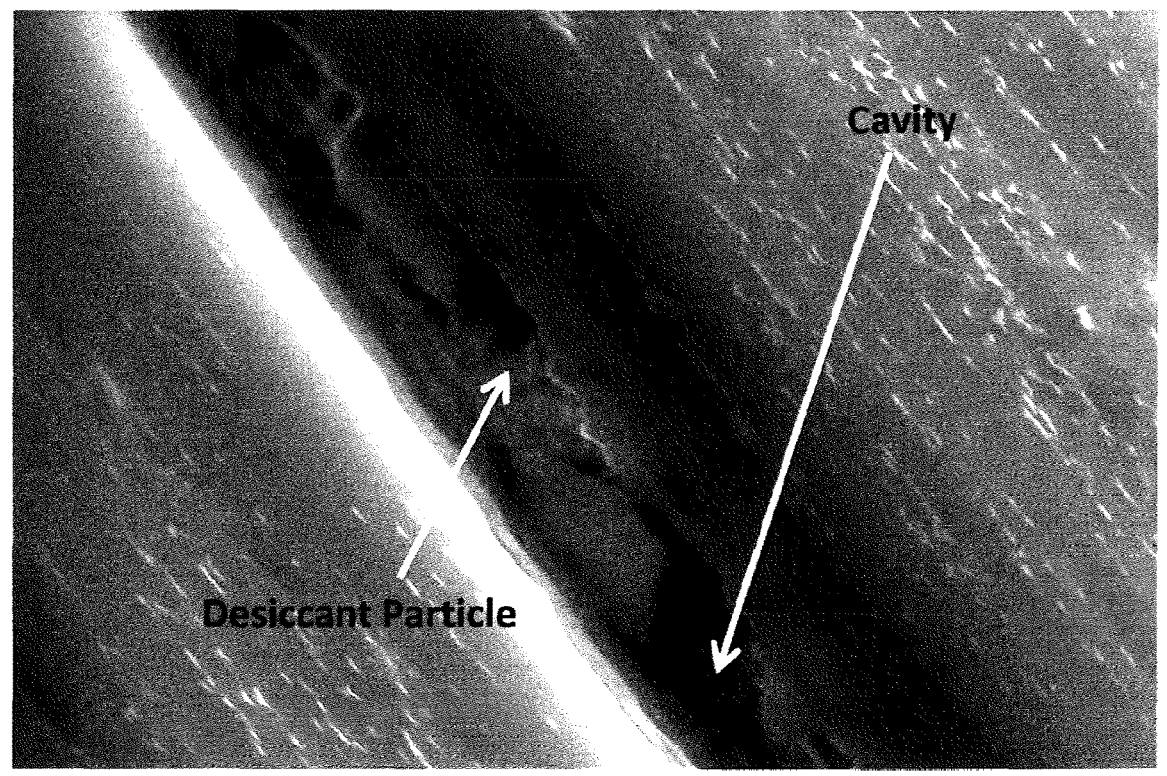
FIG. 7 is an environmental scanning electron microscopy of an oriented desiccant-containing film showing cavities and desiccant particles in communication with the cavities. A representative desiccant particle and cavity are indicated by arrows.

FIG. 7 is an ESEM of an oriented desiccant-containing film showing cavities and desiccant particles in communication with the cavities. A representative desiccant particle and cavity are indicated by arrows.

Example 3—Determination of Chemical Nature of Desiccant Particles

A working theory of the moisture barrier properties of films described herein is that driving force for the bulk properties of water favor aggregation via hydrogen bonding within a desiccant-containing inner layer of a multilayer moisture barrier is greater than the driving force for flux through the multilayer moisture barrier. In support of this theory, we have shown that active silanol groups are formed in fumed silica desiccant-containing film layers.

Infrared spectroscopy was performed on fumed silica desiccant-containing films prepared as described above in Example 1.

The films were subjected to infrared spectroscopy to identify compounds and bonds present.

Figure 8:
FIG. 8 is an infrared spectrum of an embodiment of a silica-containing film.

FIG. 8 is a spectroscopic plot indicating the presence of various species of silicon, including silanol groups.

Example 4—Moisture Absorption Testing

Mettler Vsorp test methodology was used to measure moisture absorption of the films. Vsorp instrument uses dynamic vapor sorption principle by measuring change in mass over time of the test sample that is kept under controlled and constant temperature and relative humidity. Two different test sample conditions were used: a) test film covering pan with desiccant and b) test film covering an empty pan. Under condition "a" the change in mass takes place by moisture sorption in the film and by the desiccant while condition "b" the change in mass is due to moisture sorption in the film only. Test film candidate samples were cut to 35 cm$^2$ and covered over pans filled with equal weight of desiccant. A second set test films were cut to the same size and used to cover empty pans. Both sets were exposed to test chamber conditions set to 65% RH and 40° C., which is the maximum possible combination of temperature and humidity. Pan weights were recorded every 15 mins for the full test duration of 170 hours (7 days). Results with the multilayer barrier film covering empty pan show weight gain compared to control film. The thicker multilayer barrier film shows around 1% weight gain within the first 40 hours and drops to about 0.7% and appears to gradually increase back to about 0.9% after 170 hours (duration of the test). The thinner multilayer barrier film steadily increases and seems to stabilize around 0.8% after 150 hours. Control samples show negligible weight gain and remain consistent throughout the entire test duration. The barrier film absorption behavior can be represented in two distinct phases —initial adsorption phase that follows a polynomial curve, followed by a linear absorption phase with a slower growth rate.

Example 5—Moisture Barrier Testing

Traditional WVTR testing procedures did not produce an effective measure of whether packaging that includes a multi-layer moisture barrier as described herein would have sufficient moisture barrier properties. Therefore, a new protocol was devised as follows.

Test Protocol for Complete Films

Sponges were prepared for sealing in packaging that includes multi-layer moisture barrier as follows. The sponges were boiled. This was done with the intent of removing any microbe that may have been in the sponges to prevent bacteria growth. The sponges were rinsed and wrung out. The sponges were baked for two hours in groups of 100 at 120° C. After baking the sponges were weighed and labeled from 001-800.

Packaging films were prepared as follows. The films were prepared with a cut off length of 7 inches and sealed on one end. The ends had a final width of 3.5 inches. We prepared 360 non-sealed packages of each variable. After the packages were made they were weighed and labeled as follows.

1000-1340 for film sequence one (control)
2000-2340 for film sequence two
3000-3340 for film sequence three
4000-4340 for film sequence four Sponges were packaged and packaged sponges were assayed for moisture barrier properties as follows. After the films and sponges were weighed and labeled, they were prepared into completed packages in the following steps. For a wet sponge test, the sponges were weighed before they were wetted. When wetting the sponges for the dry room, approximately 4 grams of water was added. The wet weight of the sponges was recorded. Each sponge was placed in a package. For wet sponges a guide was used so the seal area did not get wet prior to sealing. The open end of the package was sealed. A hole was punctured in the fin seal prior to recording the combined weight. When possible a heated poker was used to prevent tearing when the films were hung on racks. The combined weight of the sealed package and sponge was weighed. The weight, sponge number and the package number was recorded.

The 8 sponges from each of the ⅛$^{th}$ inch rods were hung on the racks. The dry sponge packages were placed in the 90° F., 75% relative humidity environment, and the wet sponge packages were placed in the 90° F., 15% relative humidity environment. The combined weight was recorded once a week on consistent intervals for example every Monday at 10 am. We found that keeping the measurement intervals to be important for showing the rate changes of the films moisture transmission rate. After a significant amount of time when the rates began to level off, the trial was taken down.

The steps for taking down the trial were as follows. The final combined weight of the film and sponge were recorded. One of the end seals off the package was cut. The sponge was removed and the sponge weight was recorded. The end seal that was removed was placed in the now emptied package and the package weight was recorded. Once the total weight film was recorded, the rest of the sealed film area was cut off and the exposed film weight was recorded. After recording the exposed film weight and the total exposed surface area of the film, the weight gain per unit surface area was calculated.

For each of the weeks 2, 4, and 6 we took down 30 samples of each variable so that we could accurately see how the film adsorbs moisture as a function of time. The thirty samples that were removed at the designated times were measured in the same way that the final take down samples were measured. The total film weight, exposed surface area weight, and final sponge weight was taken at designated times. The following table dictated the sample size by approximate week. The weeks were subject to change based on the behavior of the samples.

| Weeks in room | Dry Room, Wet Sponge | Wet Room, Dry Sponge | Samples taken down for each sample group |
|---|---|---|---|
| 1 | 680 | 680 | |
| 2 | 680 | 680 | −120 |
| 3 | 560 | 560 | |
| 4 | 560 | 560 | −120 |
| 5 | 440 | 440 | |
| 6 | 440 | 440 | −120 |
| 7 | 320 | 320 | |

Results

We tested samples in two different test environments varying the sample size and loading level, in each environment. The environmental testing was done by heating the samples for two hours at 120° C. in order to remove any moisture that may have been adsorbed prior to our acquisition of the sample materials. In the plaque samples the heating process showed a weight loss, on average of 1% of the samples initial weight. However, the film samples showed a weight loss of approximately 4% of the samples initial weight. The results of heating the sample would seem to suggest that moisture was indeed adsorbed by the film before we received it. After heating the samples they were placed in the two testing environments, the first environment was set at 90° F., and 75% relative humidity, the second environment was set at 70° F., and 38% relative humidity. After placement in the test environments the samples were then weighed periodically. The results of environmental testing showed that the samples adsorb moisture quickly most likely through the chemisorption process, the adsorption process then tapers off quickly as the moisture content approaches the adsorption capacity.

Figure 9:
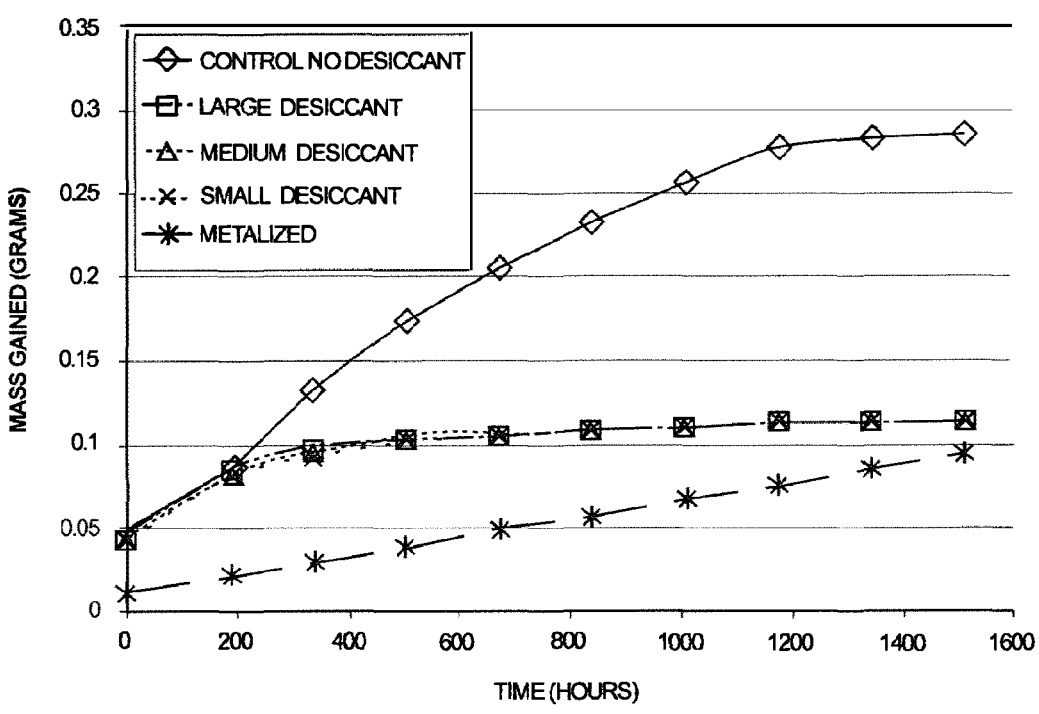
FIG. 9 is a plot of weight gain of various packages of dry sponges in a moist environment.

FIG. 9 is a plot of weight gain over time of the packaging and sponge in the moist environment (90° F. 75% relative humidity). The test packaging was oriented packaging that included an inner layer with 7 nanometer silica at 8% by weight (small desiccant), 12 nanometer silica at 10% by weight (medium desiccant) or 50 nanometer silica at 10% by weight (large desiccant). The control packaging was oriented but did not contain desiccant. Packaging was compared to a metalized film packaging, which is considered to be the gold standard for moisture barrier properties. The metalized film packaging consisted of 100 gauge oriented polypropylene/adhesive lamination/60 gauge metalized oriented polypropylene.

As shown in FIG. 9, the control packaging and sponge gained the most weight over time, while the metalized and desiccant-containing oriented packaging and associated sealed sponges gained a similar amount of weight over the course of the study (after about 1600 hours). FIG. 9 also shows that the rate of weight gain of the desiccant-containing oriented packaging and associated sponges slowed as time went on, while the rate of weight gain for the metalized packaging and associated sponge was fairly constant. By extrapolation, it is conceivable that the desiccant-containing oriented packages may prove to serve as more effective moisture barriers that the metalized packages at more extended times.

These results are surprising because the quality of the tested desiccant-containing films was less than would be produced during full-scale production. The desiccant-containing films were produced on a bench top manufacturing line and exhibited a good deal of gauge banding, with point to point variation in thickness of up to about 50%. For full-scale production, point to point variation would be expected to be about 10% or less.

It is believed that desiccant-containing films produced with less gauge banding will exhibit substantially improved moisture barrier properties. That is, it is believed that the effective thickness of the tested desiccant-containing films was substantially lower than the nominal thickness. Further, it is believed that thinner films will exhibit poorer moisture barrier properties than thicker films.

We note that measurements taken at one week were assigned time to t0 to reduce variability that may have been due to initial handling and timing of placing sponges into packages.

We also note that during the actual testing of the films, while the packages are in their testing environment, we cannot determine whether the weight we are measuring is in the film, or in the sponge. Our working theory would lead to the desiccant-containing microcavitated films themselves increasing in weight to a greater degree than the control films. Accurate measurements of the weight of the films before and after testing could show that the desiccant-containing microcavitated films exhibited better moisture barrier properties than those shown in FIG. 9, which reflect the weight of both the packaging and the sponge.

As indicated above, we could not accurately calculate the moisture transmission rate through the desiccant containing films at any given time because we could not measure how much moisture was being trapped in the film in the test protocol used.

We observed that the desiccant-containing packages and associated sealed sponges increased in weight at a rate more quickly than the metalized packaging and associated sealed sponges early in the testing (see FIG. 9) but then later increase in weight at a slower rate. Perhaps a substantial portion of the initial weight increase observed with the desiccant-containing packages and associated sealed sponges was due to an increase in weight in the package due to sorption of water rather than an increase in weight in the sponge.

For the plot presented in FIG. 9, outlying data points were eliminated. A change in more than 0.1 gram from one test period to the next was considered to be an outlier. Most outliers for the data represented in FIG. 9 was observed with the "Control No Desiccant" packaging. However, very few data points were eliminated.

We note that desiccant containing films that included a large number of cavities or pores, but a low percentage of pores with associated desiccant (via microscopic examination), produced moisture barrier properties that were only slightly better than control (no desiccant) films (data not shown). This supports our theory that better moisture barrier properties are achieved when a high percentage of cavities have a desiccant particle in communication therewith.

Thus, methods, systems, devices, compounds and compositions for MOISTURE BARRIER FILMS are described. Various modifications and variations of the layers, films, packages, packaged products and methods disclosed herein will be apparent to those skilled in the art without departing from the scope and spirit of the disclosure. Although aspects of layers, films, packages, packaged products and methods have been described in connection with specific preferred embodiments, it should be understood that the claims that follow should not be unduly limited to such specific embodiments. Indeed, various modifications of the described modes which are apparent to those skilled in chemistry; film and package manufacturing; or related fields are intended to be within the scope of the following claims.

What is claimed is:

1. A barrier film comprising at least one desiccant-containing layer disposed adjacent to at least one desiccant free layer:

the at least one desiccant-containing layer comprising a polymeric matrix defining a plurality of cavities and comprising desiccant particles, wherein at least one of the plurality of cavities has at least one desiccant particle in communication therewith, and wherein the at least one desiccant-containing layer comprises from about 0.1 wt. % to about 12 wt. % of the desiccant particles; and the at least one desiccant free layer a polymer matrix, and the at least one desiccant free layer comprises from about 20% to about 60% of the overall thickness of the packaging film.

2. The film of claim 1, wherein the at least one desiccant free layer comprises from about 30% to about 50% of the overall thickness of the packaging film.

3. The film of claim 1, wherein the at least one desiccant-containing layer is uniaxially or biaxially oriented.

4. The film of claim 3, wherein the at least one desiccant-containing layer is biaxially oriented and is oriented 2 to 6 times in the machine direction, and 2 to 6 times in the transverse direction.

5. The film of claim 3, wherein the at least one desiccant-containing layer is is biaxially oriented and oriented 4 times in the machine direction and 6 times in the transverse direction.

6. The film of claim 3, wherein the at least one desiccant-containing layer is is biaxially oriented and oriented 2 times in the machine direction and from 4 to 6 times in the transverse direction.

7. The film of claim 1, wherein the desiccant particles are selected from fumed silica particles.

8. The film of claim 1, wherein the at least one desiccant free layer comprises a first desiccant free layer and a second desiccant free layer, and one of the at least one desiccant-containing layers is disposed between the first and second desiccant free layers.

9. The film of claim 8, wherein the first and second desiccant free layers comprise from about 30% to about 50% of the overall thickness of the packaging film.

10. The film of claim 9, wherein the at least one desiccant-containing layer is uniaxially or biaxially oriented.

11. The film of claim 10, wherein the at least one desiccant-containing layer is biaxially oriented and is oriented 2 to 6 times in the machine direction, and 2 to 6 times in the transverse direction.

12. The film of claim 10, wherein the at least one desiccant-containing layer is biaxially oriented and is oriented 4 times in the machine direction and 6 times in the transverse direction.

13. The film of claim 10, wherein the at least one desiccant-containing layer is biaxially oriented and is oriented 2 times in the machine direction and from 4 to 6 times in the transverse direction.

14. The film of claim 8, wherein the desiccant particles are selected from fumed silica particles.

15. A package defining an interior space for holding a product, the package comprising the film of claim 8.

16. The film of claim 1, wherein the at least one desiccant-containing layer comprises a first desiccant-containing layer and a second desiccant-containing layer, and the at least one-desiccant free layer comprises a first desiccant free layer disposed between the first desiccant-containing layer and the second desiccant-containing layer, a second desiccant free layer disposed adjacent the first desiccant-containing layer and opposite the first desiccant free layer, and a third desiccant free layer disposed adjacent the second desiccant-containing layer and opposite the first desiccant free layer.

17. The film of claim 16, wherein the first, second, and third desiccant free layers comprise from about 30% to about 50% of the overall thickness of the packaging film.

18. The film of claim 17, wherein the at least one desiccant-containing layer is uniaxially or biaxially oriented.

19. The film of claim 18, wherein the at least one desiccant-containing layer is biaxially oriented and is oriented 2 to 6 times in the machine direction, and 2 to 6 times in the transverse direction.

20. The film of claim 18, wherein the at least one desiccant-containing layer is biaxially oriented and is oriented 4 times in the machine direction and 6 times in the transverse direction.

21. The film of claim 18, wherein the at least one desiccant-containing layer is biaxially oriented and is oriented 2 times in the machine direction and from 4 to 6 times in the transverse direction.

22. A package defining an interior space for holding a product, the package comprising the film of claim 16.

23. The film of claim 16, wherein the desiccant particles are selected from fumed silica particles.

24. A package defining an interior space for holding a product, the package comprising the film of claim 1.

25. The package of claim 24, wherein the at least one desiccant-containing layer comprises an outer layer of the film.

26. The film of claim 25, wherein the at least one desiccant free layer comprises an outer layer of the film.

* * * * *